Oct. 1, 1957             H. E. SNYDER             2,807,875
METHODS OF MANUFACTURING FINGERED JOINT PLATES
AND TUBE SKIN JOINTS THEREWITH
Filed Dec. 23, 1955
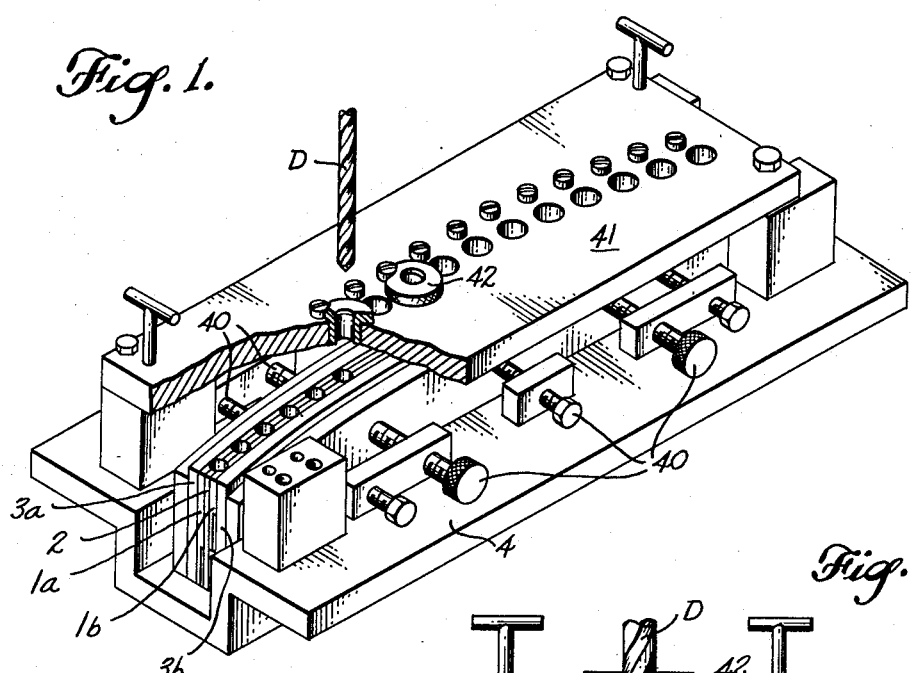
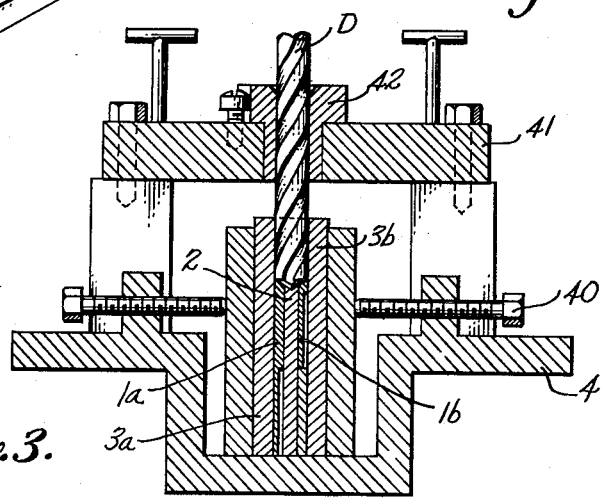
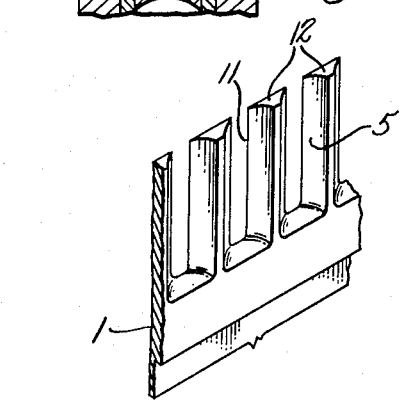
INVENTOR.
HOWARD E. SNYDER
BY Reynolds, Beach & Christensen
ATTORNEYS

United States Patent Office 2,807,875
Patented Oct. 1, 1957

2,807,875

METHODS OF MANUFACTURING FINGERED JOINT PLATES AND TUBE SKIN JOINTS THEREWITH

Howard E. Snyder, Mercer Island, Wash., assignor to Boeing Airplane Company, Seattle, Wash., a corporation of Delaware Application December 23, 1955, Serial No. 555,174

2 Claims. (Cl. 29—423)

Airplane wings and similar structure are coming into use wherein the skin is composed of inner and outer skin sheets sandwiching a plurality of tubes of like diameter, placed contiguously side by side, normally welded or otherwise bonded to each other and to the inner and outer skin sheets, and extending generally spanwise of the wing or correspondingly in a similar structure. Such wing structures and the like must be made up in sections and the sections must be capable of securement one to another by structurally strong joints. Such a joint is disclosed and claimed in the co-pending application of Richard S. Reinhold, Serial No. 538,435, filed October 4, 1955.

The Reinhold joint structure is centered primarily around the securement of finger plates to the tubes and skin sheets at each of panels to be joined, and the interconnection between such finger plates. Whereas in the Reinhold application there is lacking any disclosure as to how such finger plates are made, and various methods suggest themselves, the present invention concerns the best method of manufacture of the finger plates, and the manner in which the finger plates, made in accordance with this invention, are incorporated with the tube skin at the joint, preparatory to joining to such panels. Unless the finger plates are made in a manner analogous to the method herein disclosed and claimed, they may not fit the several tubes and skin sheets sufficiently closely, and the joint might fail for want of integrity in some of the welds; in any event, such finger plates would be much more costly if made by any other method.

The finger plate disclosed in the Reinhold application consists of a plate of appreciable length and width, formed with parallel grooves in one surface and breaking slightly through the opposite surface, which grooves in transverse section are curved to the outside diameter of the tubes, the grooves being closely enough spaced that by reason of their contour and spacing they will precisely straddle and come into complete surface contact with the tube ends at the joint. The tube exteriors are substantially tangent to the outer surface of the tube skins, or protrude just slightly therefrom, so that these tube exteriors will come into good contact with the overlying skin sheet of the wing at the same time that the skin sheet comes into surface contact with the exterior surface of the finger plates. The Reinhold application, however, does not disclose how the grooves are formed in the finger plates, in the correct orientation and spacing to match and fit closely to all the tube ends at a given joint. This is particularly a difficult problem when the joint is at a location where its edge contour is curved, for in such case, the grooves in the concave finger plate of the two paired plates that make up one side of a joint are spaced more closely than the corresponding grooves to fit the same respective tube ends, in the convex finger plate of the pair.

It is obvious that such grooves might be formed by any of several possible procedures, as for example, by a milling operation, by punch pressing, or by casting, but each of these involves certain disadvantages in terms of cost, time, and the maintenance of precision as between the successive grooves in a given finger plate, and particularly as between the corresponding grooves of a pair at opposite surfaces of the skin, especially when the edge contour is curved as indicated above.

It is, therefore, a primary object of the present invention to provide a method for manufacturing such finger plates which, regardless of edge contour or curvature, will insure that the grooves in the respective finger plates are properly located, properly sized, and properly oriented and spaced, so that each groove of each finger plate will fit accurately the tube it is intended to straddle, and the exterior surface of each finger plate will come into substantial contact with the skin sheet of the tube skin, so that good electrical contact and mechanical pressure may be obtained for joining all the parts by spot welding operations. It is, of course, an object to provide such a method which is relatively inexpensive, quite rapid, and capable of insuring exactness of matching, regardless of the edge contour, and a method which can be performed by relatively unskilled shop labor on non-critical tools, yet to close tolerances.

The accompanying drawings illustrate somewhat diagrammatically the manner in which the method of the present invention is carried out in a typical operation.

Figure 1 is an isometric view, partly broken away, illustrating parts in the process of forming the grooves in the finger plates, and Figure 2 is a transverse sectional view showing a similar stage in the operation.

Figure 3 is a transverse section through the finger plates, and associated parts, after the operation has been completed.

Figure 4 is an isometric view of a short length of such a finger plate when completed.

Referring first to Figure 4, the finger plate 1 when completed includes a series of grooves which are rounded in cross-section to a radius equal to the exterior radius of the tubes to which it is to be joined, with these grooves closely enough spaced to straddle one side of the tubes as the tubes are held in their closely contiguous relationship. However, while in theory the tube ends which are straddled should come precisely tangent to one surface of the finger plate 1, in actual practice, it is preferred that the finger plates be sufficiently slotted at this surface, as indicated at 11, that the tube may protrude just slightly, a thousandth of an inch or so, beyond the surface of the finger plate 1 in order to insure that the tube itself, as well as this surface of the finger plate 1, will come into contact with the skin sheet of the tube skin when the parts are assembled in the relationship disclosed in the Reinhold application, identified above.

As the Reinhold application discloses, two oppositely facing finger plates are employed at each side of the joint, these paired finger plates spanning the opposite edges of the same tubes. It is clear that if the edge contour of the tube skin at such a joint were perfectly straight, the grooves which receive the successive tubes would be at identical spacings in each of the two finger plates of a pair. This is sometimes the case, and it is desired to insure that these grooves are thus equally spaced. However, it is a very frequent occurrence that the edge contour of the tube skin is curved, sometimes quite abruptly, sometimes more gradually. When this is so, the spacing between the grooves in the finger plate at the convex side of such curvature is greater than the spacing between the grooves for the same successive tubes in the other finger plate of the pair, at the concave side of the curvature. Under such circumstances in particular, it is especially necessary that the grooves be formed very carefully to the correct spacing and curvature, and that they be maintained so until joined with the tubes. The present invention is particularly necessary to accomplish this end, although it is of very considerable importance even if the edge contour at the joint is straight. However, to indicate the more complex situation, the process is shown in Figure 1 in conjunction with the manufacture of a curved pair of finger plates.

The two finger plates 1 of a pair are indicated, in order to distinguish them, by the numerals 1a and 1b. In carrying out the process, two finger plate blanks (which may be edge-formed for interfitting at their ultimate juncture with another pair, in accordance with the Reinhold disclosure, either before or after the process of this invention) are assembled with a spacer plate 2 interposed between them, and constituting with the finger plate blanks a sandwich which is substantially of a thickness equal to the diameter of the tubes which the finger plates are to straddle. As has been indicated above, by preference the thickness of the sandwich is just slightly less than the diameter of the tubes, but in substance if not in actual fact the thickness of the sandwich is equal to the diameter of the tubes. This sandwich is formed to the desired edge contour and held in that disposition. The sandwich may be performed to proper contour, or it may be supported between clamping plates 3a and 3b and the whole assembly may then be curved to the proper contour by supporting it in a jig 4, and suitably applying pressure through the form-retaining plates 3a and 3b, by means such as the adjusting screws 40. The spacer plate 2 and the form-retaining plates 3a and 3b, incidentally, and particularly the former, should be expendable, that is, it is not intended that they be reused.

Thus assembled into a sandwich and bent to the proper contour and held immovable in this relationship, a drilling jig 41 is applied to the jig 4 and a drill D is directed through the drill guides 42, and edgewise into the sandwich consisting of the blanks 1a and 1b and the interposed spacer plate 2. The drill and the plates are relatively so oriented that the drill will follow down the outer surfaces of the blanks 1a and 1b, just breaking through at each outer surface of the respective plates, down to a desired depth. The orientation of the drill guides 42, it will be understood, follows the contour assumed by the sandwich when held in the jig 4, or otherwise stabilized in the desired contour. Preferably, alternate holes are drilled as described, and then the work is offset sufficiently relative to the drill, or vice versa, that the drill will drill through the intermediate locations, finally forming a series of bores, seen in Figures 1 and 2, which because the drill is of a diameter equal to the diameter of the tubes, are exactly equivalent to the diameter of the tubes which the finger plates are to straddle, and which are contiguous, as Figure 3 shows. The work may now be removed from the jig 4, and each finger plate will have a groove 5 of precisely the correct contour and at the correct spacing from the adjacent grooves. Moreover, each groove 5 in the finger plate 1a will be at the correct location and orientation with relation to the opposite groove 5 in the plate 1b, which is particularly important when the tube joint has a curved edge contour.

Pains are taken to maintain the paired finger plates 1a and 1b in the same orientation with relation to one another that they occupied during the drilling operation. The spacer plate 2 is, of course, removed and discarded, and the form-retaining plates 3a and 3b are removed, and these might be reused once or twice, for they are but slightly scored by the protrusion of the drill bore outside the outer surface of the respective finger plates 1a and 1b, sufficiently to form the slot 11, or they too may be discarded.

Now, retaining the orientation between the paired finger plates, these are applied to the ends of the tubes of a joint, the fingers 12 straddling the tubes, their exterior surfaces contacting the inner surface of applied skin sheets, and the surfaces of their partial bores or grooves 5 lying in full face contact with the surfaces of the tubes which they straddle. In this orientation they are secured to the tubes and to the skin sheets as, for instance, by a spot welding operation. The ultimate result is a joint which may be of the same nature as is disclosed in the Reinhold application.

I claim as my invention:

1. A method of manufacturing fingered joint plates, for use in joining tube skins wherein tubes of like diameter lie side by side between opposite skins to define a given edge contour, which method comprises interposing an expendible spacer plate between two such joint plate blanks, and holding them in close contact, the spacer plate being of such thickness as to define, with the two blanks, a sandwich almost as thick as the tubes' diameter, and of an edge contour coinciding with the given edge contour of the tubes, and drilling holes endwise into the sandwich to a depth equal to a part only of the width of the joint plates, and each of a diameter equal to the tubes' diameter, each centralized and aligned to break through and cut a narrow slot with parallel edges in the blanks' outer skins, and all such holes being successively tangent to one another along the edge contour.

2. A method as defined in claim 1, including the forming of the sandwich and of the form-determining plates, to a given curved edge contour prior to the drilling operation, by external forces applied to such form-determining plates.

References Cited in the file of this patent

FOREIGN PATENTS 899,084    France _____ May 18, 1945